United States Patent
Luty et al.

(10) Patent No.: US 9,298,014 B2
(45) Date of Patent: *Mar. 29, 2016

(54) IMAGE STABILIZATION SYSTEM

(75) Inventors: Clifford J. Luty, Orlando, FL (US);
Bruce A. Dickerson, Tigard, OR (US);
Bruce Ellison, Lake Oswego, OR (US);
John L. Miller, Lake Oswego, OR (US)

(73) Assignee: FLIR Systems, Inc., Wilsonville, OR (US)

(*) Notice: Subject to any disclaimer, the term of this patent is extended or adjusted under 35 U.S.C. 154(b) by 432 days.

This patent is subject to a terminal disclaimer.

(21) Appl. No.: 12/984,568

(22) Filed: Jan. 4, 2011

(65) Prior Publication Data

US 2011/0226955 A1 Sep. 22, 2011

Related U.S. Application Data

(63) Continuation-in-part of application No. 11/393,448, filed on Mar. 29, 2006, now Pat. No. 7,862,188.

(60) Provisional application No. 60/696,306, filed on Jul. 1, 2005.

(51) Int. Cl.
*G02B 17/06* (2006.01)
*G02B 27/64* (2006.01)
(Continued)

(52) U.S. Cl.
CPC ............ *G02B 27/644* (2013.01); *G02B 27/648* (2013.01); *G03B 5/00* (2013.01); *G03B 15/006* (2013.01); *H04N 5/2328* (2013.01); *H04N 5/23258* (2013.01); *G02B 17/06* (2013.01)

(58) Field of Classification Search
CPC ... G02B 27/644; G02B 27/648; G03B 15/006
USPC .................. 359/399, 861, 857, 850, 727–731
See application file for complete search history.

(56) References Cited

U.S. PATENT DOCUMENTS 2,513,723 A * 7/1950 Greenwood et al. .......... 359/728
4,123,136 A 10/1978 Dahab et al.
(Continued)

FOREIGN PATENT DOCUMENTS

DE 198 26 069 A1 12/1998
EP 0 546 811 A1 6/1993
(Continued)

OTHER PUBLICATIONS

EPO Communication pursuant to Article 94(3) EPC, European Patent Application (counterpart) Serial No. 06786098.1, dated Feb. 23, 2012.
(Continued)

*Primary Examiner* — Jennifer L. Doak
(74) *Attorney, Agent, or Firm* — Kolisch Hartwell, P.C.

(57) ABSTRACT

Imaging systems in which an undedicated optical component—i.e., a component that would be present in the system even in the absence of image stabilization—is configured to undergo corrective motion and/or other correction of image data, and thus to function as a stabilization component. The stabilization component may be a mirror and/or a lens, and a positioner may be provided to tilt, rotate, and/or otherwise precisely adjust the position and orientation of the stabilization component to improve image resolution, compensate for platform motions such as platform vibration, and/or improve image tracking. Because an undedicated optical component functions as the stabilization component, the stabilization occurs upstream, rather than downstream, from separation (if any) of the incoming image data into two or more beams. As a result, only one stabilization component is required regardless of whether the system is configured to split the image data into multiple data channels, and imaging systems as described herein therefore may be particularly well-suited for integration into a shared-aperture imaging system. In some embodiments, the coefficients of thermal expansion of selected system components—including optics, optical support structures, and/or positioners—may be substantially the same or closely matched.

20 Claims, 5 Drawing Sheets

(51) Int. Cl.
*G03B 5/00* (2006.01)
*G03B 15/00* (2006.01)
*H04N 5/232* (2006.01)

(56) References Cited

U.S. PATENT DOCUMENTS

| | | | |
|---|---|---|---|
| 4,471,448 A | 9/1984 | Williams | |
| 4,639,082 A * | 1/1987 | Loy | 359/641 |
| 5,610,757 A | 3/1997 | Ji et al. | |
| 5,963,354 A * | 10/1999 | Shiraishi et al. | 359/204.1 |
| 6,108,133 A | 8/2000 | Joffre et al. | |
| 6,201,230 B1 * | 3/2001 | Crowther et al. | 250/203.6 |
| 6,232,602 B1 | 5/2001 | Kerr | |
| 6,404,547 B1 * | 6/2002 | Hull | 359/399 |
| 6,460,803 B1 | 10/2002 | Kiss et al. | |
| 6,542,181 B1 | 4/2003 | Houska et al. | |
| 6,570,613 B1 | 5/2003 | Howell | |
| 6,738,198 B2 | 5/2004 | Kashiwaba et al. | |
| 6,969,176 B2 | 11/2005 | Pohle | |
| 7,102,664 B2 * | 9/2006 | Holdaway et al. | 348/144 |
| 7,862,188 B2 * | 1/2011 | Luty et al. | 359/861 |
| 2002/0018297 A1 | 2/2002 | Usui et al. | |
| 2002/0090147 A1 | 7/2002 | Scott et al. | |
| 2003/0231393 A1 | 12/2003 | Yamamoto et al. | |
| 2004/0021953 A1 | 2/2004 | Betensky et al. | |
| 2004/0201707 A1 | 10/2004 | Noguchi et al. | |
| 2005/0036198 A1 * | 2/2005 | Safa | 359/399 |
| 2005/0098707 A1 | 5/2005 | Wirth | |
| 2006/0071121 A1 | 4/2006 | Wescott et al. | |
| 2006/0071134 A1 | 4/2006 | Dent et al. | |
| 2006/0171022 A1 * | 8/2006 | Lundgren | 359/366 |
| 2008/0158679 A1 | 7/2008 | Luty et al. | |

FOREIGN PATENT DOCUMENTS

| | | |
|---|---|---|
| EP | 1 026 534 A1 | 8/2000 |
| EP | 1177908 A1 | 2/2002 |
| WO | 91/02995 | 3/1991 |
| WO | 00/67061 A1 | 11/2000 |
| WO | 2007005721 A1 | 1/2007 |

OTHER PUBLICATIONS

Ichimoto, K. et al. "The Solar Optical Telescope onboard the Solar-B," Optical, Infrared, and Millimeter Space Telescopes, John C. Mather, ed., Proceedings of SPIE vol. 5487 (2004) 1142-1151.

LTA Series Precision Motorized Actuators, specification sheet; Newport Corporation, 1996-2009. <http://www.newport.com/store/genproduct.aspx?id=300862&lang=1033&Section=Spec>.

Piezo-University, Dynamic Operation Fundamentals. PI (Physik Instrumente) GmbH & Co. KG, 1996-2008. <http://www.physikinstrumente.com/en/products/prdetail.php?sortnr=400600.60>.

Windecker, Robert, Examiner, European Patent Office, Extended European Search Report (supplementary European search report and European search opinion), European Patent Application No. EP 06 78 6098.1; search completion date: Oct. 12, 2010; search mailing date: Oct. 22, 2010.

Young, Lee W., Authorized officer, International Searching Authority, International Search Report, PCT Patent Application Serial No. PCT/US2006/25789; search date: Dec. 15, 2006; mailing date: Feb. 22, 2007.

Young, Lee W., Authorized officer, International Searching Authority, Written Opinion of the International Searching Authority, PCT Patent Application Serial No. PCT/US2006/25789; opinion completion date: Dec. 15, 2006; mailing date: Feb. 22, 2007.

* cited by examiner

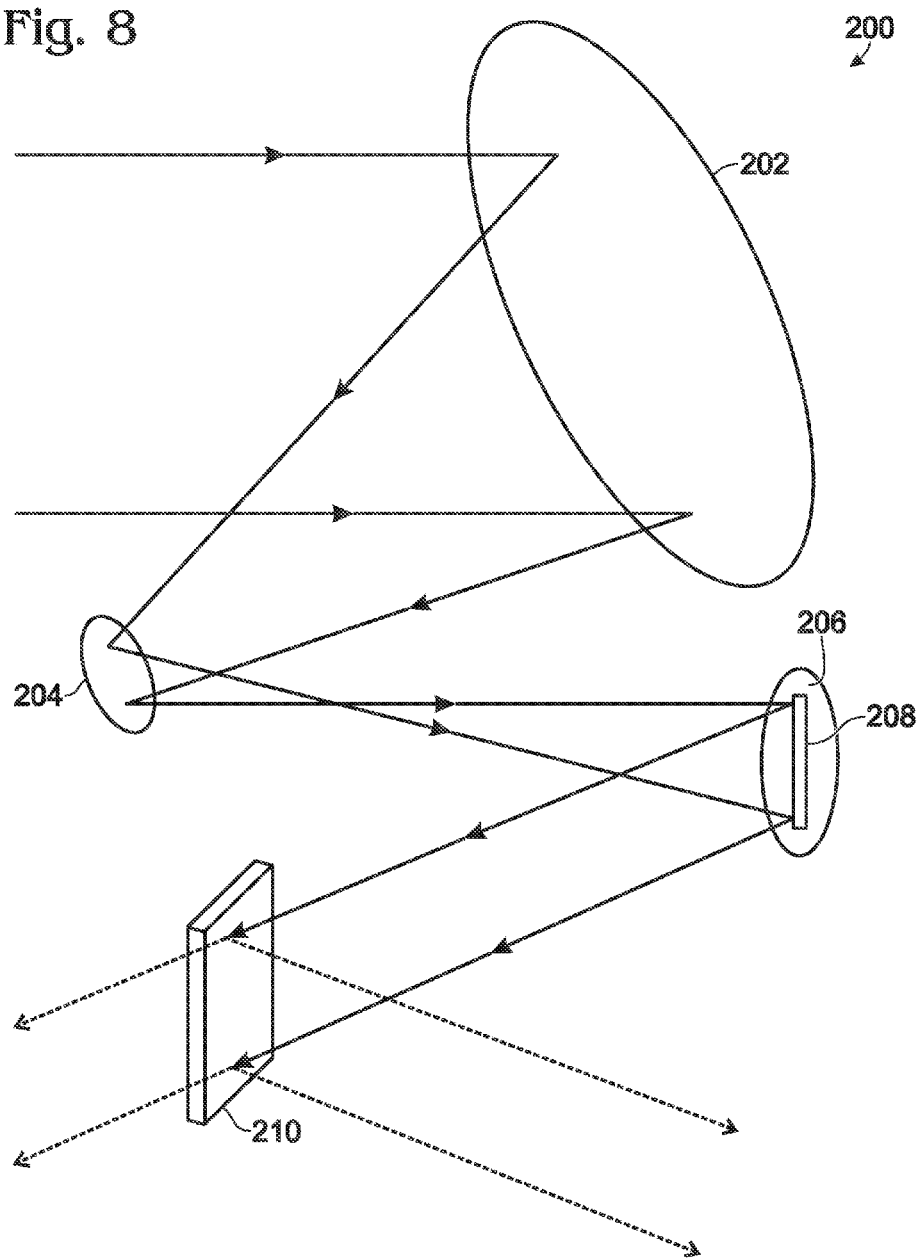

IMAGE STABILIZATION SYSTEM

CROSS-REFERENCES TO RELATED APPLICATION

This application is a continuation-in-part of U.S. patent application Ser. No. 11/393,448, filed Mar. 29, 2006, now U.S. Pat. No. 7,862,188, which in turn is based upon and claims the benefit under 35 U.S.C. §119(e) of U.S. Provisional Patent Application Ser. No. 60/696,306, filed Jul. 1, 2005. Both of these priority applications are incorporated herein by reference in their entireties for all purposes.

INTRODUCTION

Imaging systems can be used, directly or indirectly, to convert radiation into images. For example, visible-light digital cameras can translate visible light into a digital signal that can be used to produce a visible image, infrared-radiation digital cameras can translate infrared radiation into a digital signal that can be used to produce an infrared image, and so forth for other wavelength regimes. Unfortunately, images produced by such imaging systems may suffer from a variety of shortcomings, potentially causing a lack of clarity or detail in the images on a scale where increased clarity is desired. For example, images acquired from a moving platform, such as an airborne platform mounted to an airplane, a helicopter, or a satellite, may be blurred due to vibrational and/or other motions of the platform. Alternatively, or in addition, images of a moving object may be blurred due to an inability of the imaging system to track or keep pace with the moving object sufficiently effectively. Moreover, imaging systems have an inherent resolution, independent of movement, and in some instances it may be desirable to obtain an effective resolution better than this inherent resolution. Finally, it may be desirable to compensate for atmospheric effects that cause blurring or other distortions of an image.

In response to these and other imaging issues, various image stabilization systems have been developed. Some of these systems operate by tilting or otherwise moving a dedicated optical component, such as a mirror or a lens, to produce more accurate images. These dedicated components, which also may be known as stabilization components or dithering components, may undergo precise movements to acquire additional images, compensate for platform motions, and/or track moving objects. However, the addition of the dedicated stabilization components may require undesirable expense, and may take up otherwise needed space in an instrument.

Moreover, traditional stabilization systems involve the addition of separate, dedicated optical components "downstream" from the unstabilized imaging system. In this arrangement, image data reach the stabilization component after it already has been magnified or demagnified by other components of the system, and this downstream location of the stabilization component may give rise to additional drawbacks. For example, relatively large motions of the stabilization component may be necessary to accomplish the desired image correction, and this may be difficult to achieve with precision. Additionally, in cases where an incoming signal is split into multiple separate signals to produce more than one distinct image, multiple dedicated stabilization components may be required, compounding the extra expense and space required for stabilization of acquired image data. More specifically, some optical systems are configured simultaneously to produce one digital signal based on a signal received primarily in a first wavelength band, such as in the visible light band, and another digital signal based on a signal received primarily in a second wavelength band, such as in the infrared radiation band. Such optical systems may be called "shared-aperture" systems, because the visible light and the infrared radiation enter the system through the same, shared aperture. However, after entering the system, the visible light and infrared radiation typically are separated into two beams, so that they can be routed, corrected, and analyzed only using separate, dedicated optical components. Alternatively or in addition, the visible or infrared each may be divided into multiple bandpasses or colors, resulting in a greater plurality of beams. In such cases, each separate signal may need to be separately corrected for resolution and/or motion problems such as those described above, requiring two or more optical stabilization or dithering components.

Given the undesirable expense and space requirements of providing dedicated stabilization components in an optical system, particularly in the case of shared-aperture systems, which, as described above, may require multiple dedicated stabilization components, there is a need for improved image stabilization systems capable of increasing the effective image resolution of an optical instrument, correcting for platform motions, and/or tracking moving targets, without requiring the introduction of one or more dedicated new optical components into the system.

SUMMARY

The present teachings provide imaging systems in which an undedicated optical component—i.e., a component that would be present in the system even in the absence of image stabilization—is configured to undergo corrective motion and/or otherwise to correct image data, and thus to function as a stabilization component. The stabilization component may be a mirror and/or a lens, and a positioner may be provided to tilt, rotate, and/or otherwise precisely adjust the position and orientation of the stabilization component to improve image resolution, compensate for platform motions such as platform vibration, and/or improve image tracking. Because an undedicated optical component functions as the stabilization component, the stabilization occurs upstream, rather than downstream, from separation (if any) of the incoming image data into two or more beams. As a result, only one stabilization component is required regardless of whether the system is configured to split the image data into multiple data channels, and imaging systems as described herein therefore may be particularly well-suited for integration into a shared-aperture imaging system. In some embodiments, the coefficients of thermal expansion of selected system components—including optics, optical support structures, and/or positioners—may be matched.

BRIEF DESCRIPTION OF THE DRAWINGS

FIG. 8 is a schematic view of an exemplary three-mirror assembly including a positioner configured to adjust the position and/or orientation of a tertiary mirror.

DEFINITIONS

Figure 1A:
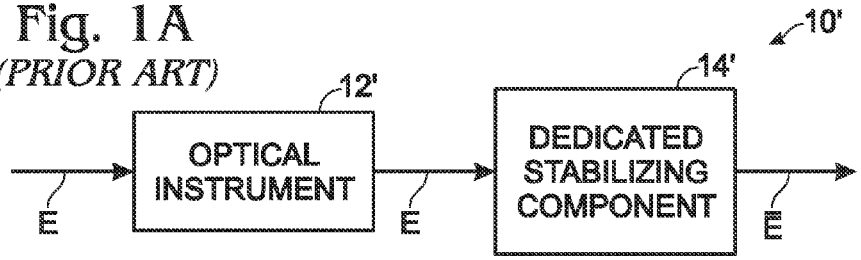
FIG. 1A is a schematic overview of a prior art image stabilization system including an optical instrument and a separate dedicated stabilizing optical component.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by radio radiation and x-ray radiation, collectively may be termed optical radiation.

Ultraviolet radiation. Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Visible electromagnetic radiation having wavelengths from about 360 or 400 nanometers, just longer than ultraviolet radiation, to about 760 or 800 nanometers, just shorter than near infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm (or longer)) light, among others.

Infrared (IR) radiation. Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). In the United States, the following classifications also commonly are used: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, may alternatively, or in addition, be termed millimeter-wave (MMV) wavelengths.

DETAILED DESCRIPTION

The present teachings provide imaging systems in which image stabilization may be accomplished through motions of and/or other image corrections occurring at an undedicated optical component, such as a mirror or a lens, that would be present in the system even in the absence of image stabilization, as described herein. The stabilization component may be a mirror and/or a lens, and a positioner may be provided to tilt, rotate, and/or otherwise adjust the position and orientation of the stabilization component to improve image resolution, compensate for platform motions such as platform vibration, and/or improve image tracking. Because an undedicated optical component functions as the stabilization component, the stabilization occurs upstream, rather than downstream, from separation (if any) of the incoming image data into two or more beams. As a result, only one stabilization component is required regardless of whether the system is configured to split the image data into multiple data channels, and imaging systems as described herein therefore may be particularly well-suited for integration into a shared-aperture imaging system.

The imaging system may include any suitable imaging device, such as a three-mirror assembly, an on-axis reflecting telescope, and/or a refracting telescope, having a fixed or variable field of view, or having multiple discrete fields of view, wherein one or more undedicated optical elements of the imaging device is configured to move in a manner that improves image resolution, stabilization, and/or tracking. For example, if the imaging system includes a reflecting telescope, such as a three-mirror assembly (TMA) or a Newtonian telescope, one or more of the mirrors of the telescope may be configured to move. Similarly, if the imaging system includes a refracting telescope, one or more of the lenses of the telescope may be configured to move. Moreover, if the imaging system includes a catadioptric telescope, such as a Cassegrain telescope, one or more of the mirrors and/or lenses of the telescope may be configured to move.

Further aspects of the present teachings are described below, including, among others, (I) overview, (II) imaging systems, (III) support platforms, (IV) multi-channel embodiments, and (V) examples.

I. Overview

This section presents an overview of the present teachings.

FIG. 1A shows a prior art imaging system 10, in which image data E (represented by the directional arrows) are received and processed by an optical instrument 12. The data arriving at instrument 12 are unstabilized, for example, due to platform motions, atmospheric distortion, object movement, and/or inherent resolution limitations of the instrument. Instrument 12 processes the data, typically through magnification, filtering, or the like, without stabilizing the image. After leaving instrument 12, the unstabilized image data are directed toward a dedicated stabilizing component 14, such as a lens or mirror, which stabilizes the image through dithering or other precise compensatory motions of the stabilizing component. The stabilized image data $\bar{E}$ then may be directed toward a detector (not shown), such as a camera or other form of signal processor.

Figure 1B:
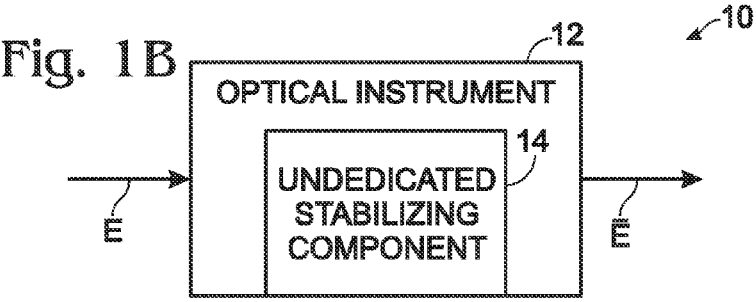
FIG. 1B is a schematic overview of an image stabilization system including an optical instrument having an undedicated stabilizing optical component, according to aspects of the present teachings.

FIG. 1B, in contrast, shows an alternative imaging system 10, according to aspects of the present teachings. In system 10, unstabilized image data E again are received and processed by an optical instrument 12. However, in addition to processing the data through magnification and/or in other suitable ways, instrument 12 includes an undedicated stabilizing component 14 that also stabilizes the image, so that stabilized image data $\bar{E}$ (represented herein by an overbar) exits the instrument. This undedicated optical component may take the form, for example, of a lens or mirror that would be present in instrument 12 even in the absence of image stabilization, but that has been configured to undergo precise compensatory motions to stabilize images during processing by instrument 12.

The approach described in the present teachings—using an undedicated optical component for image stabilization—optionally may provide one or more advantages over using one or more dedicated stabilization components and/or moving an entire platform to stabilize an image. In general, such improved systems may avoid the need for additional optical components, and therefore may be more compact and inexpensive to manufacture. Moreover, in addition to spatial and economic savings, such an approach may reduce the motion required for stabilization or dithering, because of the large magnification provided in an optical system by moving a small element through a very small distance, particularly early in the optical path, compared with moving an entire platform.

Figure 2:
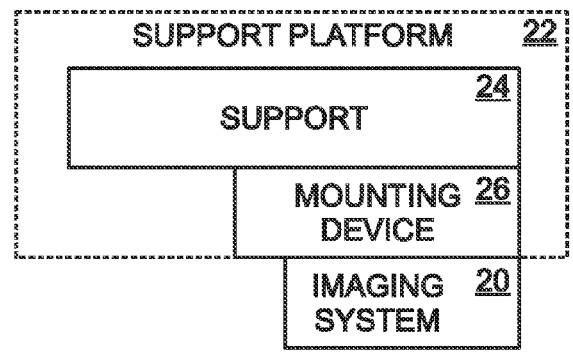
FIG. 2 is a schematic view of an imaging system, such as the imaging system of FIG. 1B, associated with a support via a mounting device.

FIG. 2 schematically depicts an exemplary imaging system 20, in accordance with aspects of the present teachings, mounted to a support platform 22 that includes a support 24 and a mounting device 26. Imaging system 20 generally comprises any device or assembly of devices configured to generate and stabilize an image, or an image signal, as described herein, based on received energy, such as electromagnetic radiation. The imaging system may include an analog camera that receives radiation and exposes film based on the received radiation, thus producing an image on the film. Alternatively, or in addition, the imaging system may include a digital camera that receives radiation and generates a digital image signal that includes information that can be used to generate an image that visually portrays the received radiation. "Imaging energy," as used herein, may include any type of energy, particularly electromagnetic energy, from which an image can be generated, including but not limited to ultraviolet radiation, visible light, and infrared radiation.

Figure 3:
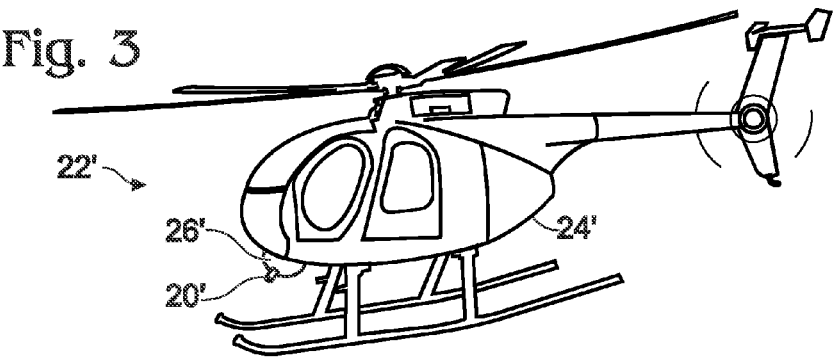
FIG. 3 is an axonometric view of an exemplary imaging system associated with an exemplary support (i.e., a helicopter) via an exemplary mounting device (i.e., a gimbal). The imaging system, support, and/or mounting device may represent specific embodiments of the like-named components of FIG. 2.

The imaging system can be mounted to any suitable support platform(s), via any suitable mounting mechanism(s), while remaining within the scope of this disclosure. FIG. 3 shows one such embodiment in which an imaging system 20 is mounted to a support platform 22 that includes a support in the form of a helicopter 24 and a mounting device in the form of a gimbal system 26. The illustrated helicopter and gimbal system are provided as a nonlimiting example of a suitable support platform. In other embodiments, imaging systems may be used with different support platforms and/or no support platforms whatsoever. A "support platform," as used herein, may be used to describe virtually any device or assembly that supports an imaging system. A support platform may include only a support or mounting device, or a combination of a support, mounting device, and/or one or more other components.

Further aspects of the imaging system, support, and mounting device are described below.

II. Imaging Systems

An "imaging system," as used herein, generally refers to any mechanism for imaging and detecting radiation. Imaging may involve optically forming a duplicate, counterpart, and/or other representative reproduction of an object or scene, especially using a mirror and/or lens. Detecting may involve recording such a duplicate, counterpart, and/or reproduction, in analog or digital formats, especially using film and/or digital recording mechanisms. The imaging system may include one or more optics, such as a mirror or lens, that can be moved to stabilize and/or otherwise manipulate an image.

Figure 4:
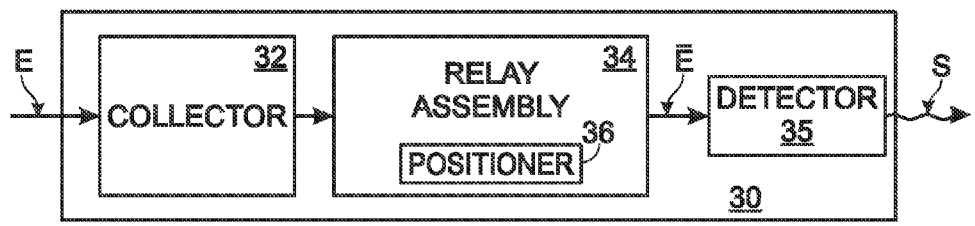
FIG. 4 is a schematic view of an exemplary image stabilization system, including a positioner configured to make precise adjustments in position and/or orientation of an optical component of the system.

FIG. 4 shows an exemplary imaging system 30. The system includes an energy collector 32, a relay assembly 34, and a detector 35. The system can convert unstabilized incoming image data into stabilized outgoing image data, either in a single or multiple wavelength bands. In FIG. 4, the system is shown converting input energy E, such as single or multi-band input energy, into stabilized output energy $\bar{E}$, such as single or multi-band stabilized output energy, that in turn may be converted into a corresponding image signal S. This disclosure is not intended to be limited to a particular type of image stabilization. Rather, this disclosure teaches various arrangements that allow virtually any type of image stabilization to be executed, including stabilization of imaging energy that includes different components, or wavebands, of imaging energy that subsequently are separated and processed independently of one another.

Further aspects of imaging systems are described below, including, among others, (A) energy collectors, (B) relay assemblies, (C) positioners, and (D) detectors.

II.A. Energy Collectors

Energy collector 32 can be absent, present, and/or variously configured, depending on the types of energy to be collected. In some embodiments, energy collector 32 can include an aperture for receiving energy such as ultraviolet radiation, visible light, and/or infrared radiation. In the same and/or other embodiments, the energy collector may include an objective lens, for example, located at or near an aperture, for directing received radiation to a relay assembly.

II.B. Relay Assemblies

Relay assembly 34 can direct received energy, such as ultraviolet radiation, visible light, and/or infrared radiation, to a common and/or band-specific energy channel. In some embodiments, the imaging energy directed from the multi-band energy channel to the band-specific energy channel may be routed through an intermediate splitter configured to separate the imaging energy into different wavebands and/or one or more intermediate filters configured to block the transmission of one or more wavebands of energy (see below).

Relay assemblies, like energy collectors, can be variously configured. The relay assembly can be used to direct imaging energy part or all of the way between a collector and a detector, for example, from a collector to a beamsplitter, or to a band-specific energy channel, and optionally to a detector. The relay assembly also can include one or more positioners. Positioners, such as positioner 36, can be configured to move one or more elements of the imaging system in relation to one or more other elements of the imaging system.

Figure 5A:
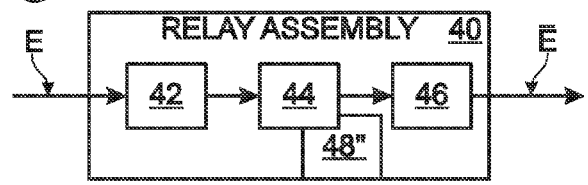
FIG. 5A is a schematic view of an exemplary image stabilization system, such as the image stabilization system of FIG. 4, in which the positioner is configured to adjust the position and/or orientation of a secondary mirror of a three-mirror assembly.
Figure 5B:
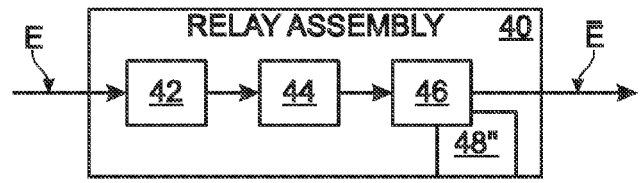
FIG. 5B is a schematic view of an exemplary image stabilization system, such as the image stabilization system of FIG. 4, in which the positioner is configured to adjust the position and/or orientation of a tertiary mirror of a three-mirror assembly.

FIGS. 5A-5B show schematic views of two exemplary relay assemblies 40 and 40, respectively, from a three-mirror (or other three-component) imaging system. These two exemplary assemblies each include a primary light-gathering mirror 42, a secondary mirror 44, a tertiary mirror 46, and a positioner 48 (FIG. 5A) or 48 (FIG. 5B), among other components. In some embodiments, the positioner may be used to move primary mirror 42. In FIG. 5A, positioner 48 is used to move secondary mirror 44. In FIG. 5B, positioner 48 is used to move tertiary mirror 46. More generally, the positioner (or a combination of positioners) may be used to move any suitable optical element, or elements, including mirrors, lenses, and/or splitters, among others, in any suitable imaging system.

II.C. Positioners

"Positioner," as used herein, generally refers to any mechanism(s) for moving an optical element, with a desired speed and accuracy, for either single or multi-axis motion. Suitable mechanisms may include, but are not limited to, piezoelectric devices, electro-optical materials, and/or fast steering motors, among others. Piezoelectric devices may be particularly advantageous positioners. These devices can include a crystal that changes shape by a small and predictable amount when subjected to an externally applied voltage. Significantly, because even large changes in the externally applied voltage give rise to only very small changes in the size of the crystal, this size can be changed with better-than-micrometer (micron), or in some cases nanometer, precision, making piezoelectric crystals suitable for positioning objects with extreme accuracy.

The positioner can be configured to move an element of the imaging system in any suitable or desired manner, for example, by reorienting the element (e.g., tilting the element), by moving the element laterally or transversely (e.g., from side to side and/or up and down, at least substantially perpendicular to the light path), and/or by moving the element longitudinally (e.g., forward or backward, at least substantially parallel to the light path), among others. Such movements can include continuous adjustments, noncontinuous or discontinuous adjustments, scanning, and/or dithering, among others.

Although the positioner is designed to impart commanded motion to an optical component, care must be taken to prevent the positioner from imparting undesired motion to the optical element, which can manifest itself as boresight error, position error, and/or image jitter. Differences in the coefficients of thermal expansion (CTE) between the positioner, the lenses or mirrors of the optical assembly, and the optical support structure (or metering structure) can cause undesired motion of the optical element as the temperature (and thus the relative sizes of components) of the optical assembly changes. For this reason, it is desirable to match the CTEs of the optical elements, the metering structure, and the positioner (i.e., to select components with at least substantially the same CTEs). This may be particularly important when the articulated mirror is in image space, as in examples here, as opposed to collimated space. Suitable materials may include nickel-steel alloys such as Invar 39 (39Ni/Fe) (e.g., for the positioning stage) and silicon carbide (e.g., for the optics), among others.

Figure 6A:
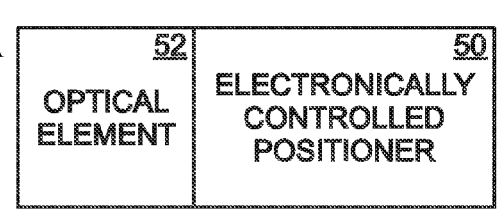
FIG. 6A is a schematic view of an electronically controlled positioner and an associated optical element, such as a mirror (reflective element) or lens (refractive element).
Figures 6B, 6C:
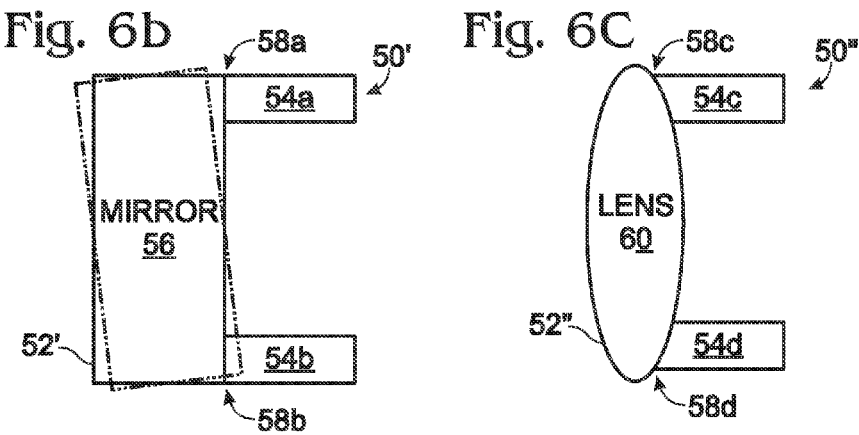
FIG. 6B is a schematic view of an electronically controlled positioner and an associated mirror (reflective element).
FIG. 6C is a schematic view of an electronically controlled positioner and an associated lens (refractive element).

FIGS. 6A-6C show schematic views of three exemplary positioners and associated optical elements. In these embodiments, the positioner is electronically controlled. FIG. 6A is a general schematic for these systems, showing an electronically controlled positioner 50 that is operatively coupled to an optical element 52, such that the positioner can adjust the orientation and/or position of the optical element. In general, any suitable positioner(s) can be coupled to any suitable optical element(s). In FIG. 6B, which shows a specific embodiment involving a reflective optical element 52, an electronically controlled positioner 50, including piezoelectric devices 54a and 54b, is coupled to a mirror 56. Specifically, piezoelectric device 54a is coupled to a top portion 58a of the mirror, and piezoelectric device 54b is coupled to a bottom portion 58b of the mirror. In FIG. 6C, which shows a specific embodiment involving a refractive optical element 52, an electronically controlled positioner 50, including piezoelectric devices 54c and 54d, is coupled to a lens 60. Specifically, piezoelectric device 54c is coupled to a top portion 58c of the lens, and piezoelectric device 54d is coupled to a bottom portion 58d of the lens.

Two or more piezoelectric devices (and/or other drivers) can be coupled to two or more different portions of an optical element, such that the different portions may be individually controlled by the different piezoelectric devices. For example, in FIGS. 6B and 6C, piezoelectric devices 54a and 54c are coupled to top portions 58a and 58c of mirror 56 or lens 60, respectively, and piezoelectric devices 54b and 54d are coupled to bottom portions 58b and 58d of mirror 56 or lens 60, respectively. Additional (and/or alternative) piezoelectric devices may be coupled to other portions of the mirror or lens, for example, in and out of the page (as shown in FIGS. 6B and 6C), parallel to piezoelectric devices 54a and 54c, or 54b and 54d. In the illustrated arrangements, similar voltages can be applied to both piezoelectric devices for a given optical element to cause both piezoelectric devices to "grow" (or "shrink") by the same amount, thus shifting mirror 56 or lens 60 without changing its orientation. Alternatively, different voltages can be applied to both piezoelectric devices for a given optical element to cause one device to grow (or shrink) more than the other, tilting the mirror or lens. For example, as shown in FIG. 6B, if a higher voltage is applied to piezoelectric device 54a than to piezoelectric device 54b, mirror 56 will tilt or rotate counterclockwise (about its optical center axis), as indicated in (exaggerated) dashed lines. With the addition of other fixed (or controllable) attachment points to the optical element, multi-axis motion control of the image data can be achieved.

The positioning of the various piezoelectric devices can be configured to facilitate movement of an optical element through a range of desired orientations and/or positions. For example, in some embodiments, the mirror or lens may have a diameter of about 2 inches, and the piezoelectric devices, which may be mounted near the periphery of the mirror or lens, may be able to grow or shrink by about 0.0015 inches each. Thus, the total available angular range can be determined as follows (using the small angle approximation):

$$\text{Angular Range} \approx \tan(\text{travel of optic/radius of optic})$$
$$\approx \text{travel of optic/radius of optic}$$
$$\approx (2 \times 0.0015 \text{ inches})/(1/2 \times 2 \text{ inches}) \text{ radians}$$
$$\approx 3{,}000 \text{ microradians}$$

In some embodiments, depending on which optical element is directionally modulated, stabilization may be effected using about 0 to 20 microradians, or more specifically about 10 microradians, of this range, and dithering may be effected using about 0 to 30 microradians, or more specifically about 15 microradians, of this range.

Positioners and optical elements can be coupled or otherwise associated via any suitable mechanism. For example, in some embodiments, a positioner can be coupled to an optical element, or other suitable device, via an intermediate mounting structure, such as a tilt plate. A suitable intermediate structure may provide increased optical flexibility, allowing the constituent elements of a positioner to be located out of an optical path. An electronically controlled voltage regulator, or other suitable device, can be used to regulate the voltages applied to the different components of an electronically controlled positioner, such as piezoelectric devices, thus controlling the orientation and/or position of the corresponding optical element.

In addition to, or in lieu of, the mechanical positioners described above, other corrective elements may be used in association with one or more of the optical elements of the system described herein. For example, a mirror or lens may include one or more deformable portions, such as a deformable top portion and a deformable bottom portion, which may deform piezoelectrically without the need for separate piezoelectric positioners. Furthermore, an alternative corrective element, such as an electro-optic modulator or a tunable filter, may be used to correct image data reflected from at least one of the mirrors or lenses of the imaging system. In this case, the alternative corrective element typically will be operatively connected to the at least one mirror or lens with which it is associated.

II.D. Detectors

Detectors, or signal generators, such as detectors 76, generally comprise a mechanism for detecting spatially distributed imaging energy (e.g., visible light and/or infrared radiation, among others) and converting it to a representative signal. Suitable detectors may include (1) array detectors, such as charge-coupled devices (CODs), charge-injection devices (CIDs), complementary metal oxide semiconductor (CMOS) arrays, photodiode arrays, and the like, and/or (2) arrays of point detectors, such as photomultiplier tubes (PMTs), photodiodes, pin photodiodes, avalanche photodiodes, photocells, phototubes, and the like. Detectors can be sensitive to the intensity, wavelength, polarization, and/or coherence of the detected imaging energy, among other properties, as well as spatial and/or temporal variations thereof.

III. Support Platform

The imaging systems described herein may be used in association with a "support platform" that includes (A) a support, and (B) an optional mounting device.

III.A. Support

A "support," as used herein, generally refers to any mechanism for holding, bearing, and/or presenting an imaging system. The support typically is selected to complement the function of the imaging system. For example, in some embodiments, an imaging system can be supported by a moving support, such as a helicopter, airplane, glider, dirigible, balloon, drone, boat, car, truck, motorcycle, missile, rocket, satellite, and/or other vehicle, among others. A flying or orbiting support, such as a helicopter or satellite, may be used for airborne or space-based imaging, while a terrestrial support, such as a car, truck, or motorcycle, may be used for ground-based imaging. In the same and/or other embodiments, an imaging system can be supported by a stationary support, such as a fixed observation tower and/or platform, among others, or a temporarily stationary moving support, such as a hovering helicopter and/or a parked car, truck, or motorcycle, among others. The support vehicle can impart vibration to the sensor system. This vibration can be mitigated or removed by feeding the output of a sensing device (like a gyroscope or inertial measurement unit (IMU)) into the microscanned tertiary. In other words, the sensing device may be used to measure payload motion, including motion of the support and/or mounting device (next section). The imaging system, and stabilized components in particular, may further be nested within an inertially stabilized platform. The stabilized components of the optical system remove the residual jitter (providing, in essence, an extra stabilization stage). This may allow the imaging system to correct large image jitter without degrading the image (e.g., without introducing aberrations).

III.B. Mounting Device

A "mounting device," as used herein, generally refers to any mechanism for connecting, or otherwise associating, an imaging system, as well as other components, to a support. In some embodiments, a mounting device can be configured to position and/or aim the imaging system, or other components, in relation to the support. For example, in some embodiments, a gimbal system can be used to mount an imaging system to a support. A gimbal system, as used herein, generally comprises any device-mounting mechanism that includes at least two different axes of rotation, thus providing angular movement in at least two directions. A gimbal system can be configured to rotate a payload about any suitable or desired number of axes, including two axes, three axes, four axes, five axes, six axes, or even more than six axes. In some embodiments, the different axes of rotation may be collinear or coplanar. In some embodiments, at least one axis may be located in a different plane than another axis. The axes of rotation typically are either perpendicular to one another or parallel to (including collinear with) one another, although this is not required. Nonparallel axes allow a payload to be aimed two dimensionally, such as up and down, as well as side to side. In some embodiments, parallel axes, or substantially parallel axes, can be used to provide increased precision, with a first level of rotation about a first axis providing coarser large-magnitude adjustments and a second level of rotation about a second axis parallel to the first axis providing finer small-magnitude adjustments.

The mounting device (and/or support) can be used for any suitable function(s), including enabling and/or otherwise facilitating any suitable imaging system functions. For example, a gimbal system can be used to point a payload of one or more devices at a desired target or in a desired direction and/or to hold a payload in a substantially fixed orientation as the support to which the gimbal is mounted moves. In some cases, the mounting device may be used to allow and/or account for pitch, yaw, and/or roll, among other motions, by one or more system components. Consistent with this flexibility, a gimbal system can be used with an imaging system including one or more still cameras, motion cameras, ultraviolet cameras, visible-light cameras, infrared cameras, and/or compasses, among others.

Some payload components occupy a relatively large volume. For example, camera lenses can be fairly large when designed to provide magnification and/or to work in low-light conditions. Such payload components, individually or collectively, can occupy all of the payload capacity that a gimbal system provides. Therefore, it is desirable to design gimbal systems with increased payload capacity, so that larger and/or more payload components can be accommodated by a single gimbal system. Similarly, it also is desirable to decrease the volume a device requires to perform a desired function, thus effectively freeing space for other devices. It also is desirable to lower the cost of manufacturing an imaging system and/or associated support platforms. Exemplary gimbal systems suitable for use with the imaging system and supports described herein are described in the following U.S. patent applications, which are incorporated herein by reference in their entireties for all purposes: Ser. No. 10/956,738, filed Oct. 1, 2004, and published as US-2006-0071121-A1 on Apr. 6, 2006; and Ser. No. 10/956,739, filed Oct. 1, 2004, and published as US-2006-0071134-A1 on Apr. 6, 2006.

III.C. Relationship(s) Between Support and Mounting Device

A support, such as a helicopter, and a mounting device, such as a gimbal system, may be connected, joined, and/or otherwise associated using any suitable mechanism, with any suitable orientation. For example, when used with a helicopter, a gimbal system may be bottom-mounted, side-mounted, top-mounted, front-mounted, rear-mounted, externally mounted, internally mounted, and so on. Moreover, such mounting may be static or dynamic, for example, in the latter case optionally involving additional gimbal(s).

IV. Multiple-band Imaging Systems

This section describes selected aspects of multiple-band imaging systems.

Imaging systems according to the present teachings may be configured to receive and process either a single or a multi-band energy channel. In other words, the system may be configured to receive and process electromagnetic radiation having one or more energy (i.e., wavelength or frequency) bands, such as a visible-light component and an infrared-radiation component, among others. For example, the system may be configured to process a first (e.g., visible-light) energy channel and direct it to a first (e.g., visible-light) detector configured to translate the visible-light component into a first signal, and it may be further configured to process a second (e.g., infrared-radiation) energy channel and direct it to a second (e.g., infrared-radiation) detector configured to translate the infrared-radiation component into a second signal. Embodiments configured to correct multiple energy channels simultaneously (i.e., to perform multispectral correction) may save cost and space. For example, they may allow addition of distinct energy bands, such as visible light, to infrared systems.

In cases where the system is configured to separately process multiple wavelength bands, using an undedicated stabilization component may have an additional advantage beyond those already described above, because such an arrangement can obviate or reduce the need to stabilize and/or dither separate bands of imaging energy separately and independently after they have been separated. More specifically, stabilizing and/or dithering the imaging energy before it is split into component parts can decrease the amount of equipment needed to stabilize the imaging energy (e.g., using one positioner, and associated wiring and controllers, as opposed to two or more positioners), realize space in an otherwise crowded mounting device, provide bore-sighted registered microscan and stabilization of multi-band images to allow image fusion, and/or provide economic savings, among other advantages.

Figure 7A:
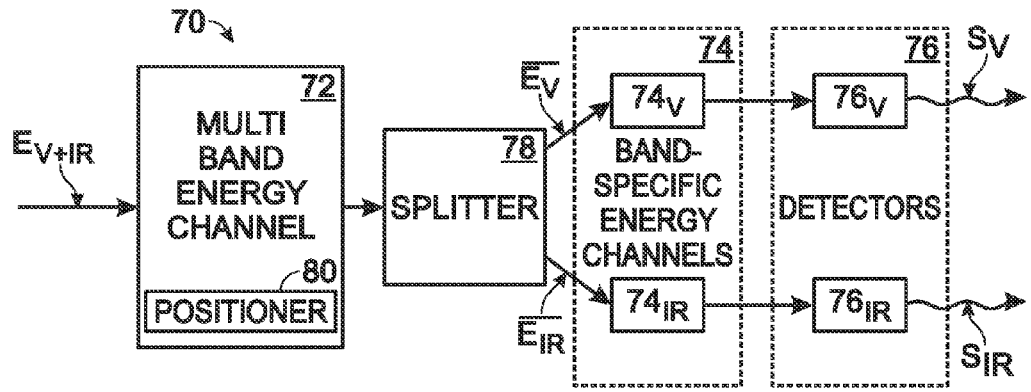
FIG. 7A is a schematic view of an exemplary shared-aperture imaging system having two band-specific energy channels.

FIG. 7A schematically depicts an exemplary multiple-band imaging system 70. This system is capable of generating image signals based on two or more different types or wavebands of imaging energy. For example, imaging system 70 can be configured to generate a first image signal $S_V$ representative of visible light and a second image signal $S_{IR}$ representative of infrared radiation. Visible light and infrared radiation are both types of electromagnetic radiation (see Definitions); however, they are characterized by different wavebands of electromagnetic radiation that can contain or manifest different information that can be used for different purposes. For example, visible light can be used to generate an image signal that in turn can be used to create a photograph or movie showing how a scene appears to a human observer. In contrast, infrared radiation can be used to generate an image signal that in turn can be used to create a heat profile showing heat intensity information for a scene. More generally, the imaging system may be used with any suitable set of first and second (or any integer number of) image signals, with any suitable wavelength bands. These suitable image signals can include first and second visible wavebands, first and second infrared wavebands, mixtures of visible, infrared, and/or ultraviolet wavebands, and so on, depending on the desired application.

Imaging system 70, as illustrated in FIG. 7A, includes a multi-band energy channel 72, at least one band-specific energy channel 74, and at least one detector, or signal generator, 76. Imaging system 70 also may include a beamsplitter 78, which is configured to separate multi-band energy from the multi-band energy channel into band-specific energy for the band-specific energy channels.

Beamsplitters, such as beamsplitter 78, generally comprise optical devices configured to separate electromagnetic radiation into different wavelength bands, for example, separating a visible light band from an infrared radiation band. Suitable beamsplitters (such as dichroic or multi-dichroic beamsplitters) may operate by a variety of mechanisms, for example, by transmitting one wavelength band while reflecting another wavelength band, and/or by deflecting or diffracting one wavelength band to a different extent than another wavelength band. Suitable beamsplitters may include prismatic materials, such as fused silica or quartz, and may be coated with a metallic or dielectric layer having wavelength-dependent transmission and reflection properties. Alternatively, or in addition, suitable beamsplitters may include diffractive materials or devices, such as an acousto-optic modulator. Beamsplitters that divide the energy from a single band into two paths may also be used with the present teachings.

The exemplary imaging system depicted in FIG. 7A can direct imaging energy $E_{V+IR}$, which may include two or more waveband components, such as a visible-light component and an infrared-radiation component, toward beamsplitter 78 via multi-band energy channel 72. Energy channel 72 may process the image data by magnifying and/or stabilizing it as described above, before directing the processed data toward the beamsplitter. To stabilize the signal, multi-band energy channel 72 may include a positioner 80 configured to stabilize and/or dither imaging energy that may include more than one band of energy, with potential savings and advantages, as discussed above.

After processing, the beamsplitter separates the imaging energy into two or more components, such as a stabilized visible-light component $\overline{E_V}$ and a stabilized infrared-radiation component $\overline{E_{IR}}$. These components then are directed independently to two or more respective detectors, such as a visible-light detector $76_V$ and an infrared-radiation detector $76_{IR}$, by two or more respective energy channels, such as a visible-light energy channel $74_V$ and an infrared-radiation energy channel $74_{IR}$. The visible-light detector can be configured to translate the visible-light component into a visible-light image signal $S_V$, and the infrared-radiation detector can be configured to translate the infrared-radiation component into an infrared-radiation image signal $S_{IR}$.

Figure 7B:
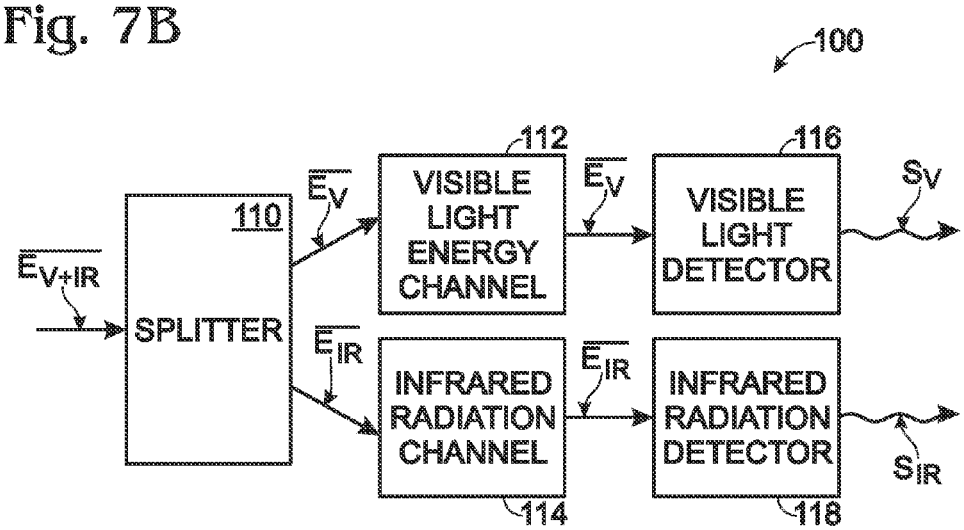
FIG. 7B is a schematic view of an exemplary shared-aperture imaging system having a visible-light energy channel and an infrared energy channel that respectively direct visible light and infrared radiation from a splitter to a visible-light detector and an infrared-radiation detector.

FIG. 7B is a schematic depiction showing a more specific example of a dual-band imaging system 100 that may be integrated with an image stabilization system incorporating an undedicated optical stabilization component. System 100 includes a beamsplitter 110, and associated downstream visible-light and infrared-radiation energy channels 112, 114. The beamsplitter receives stabilized multi-band imaging energy $\overline{E_{V+IR}}$, which includes combined visible-light and infrared-radiation components, from a multi-band energy channel (see, e.g., FIGS. 4-6) and separates the multi-band energy into a discrete visible-light component $\overline{E_V}$ and a discrete infrared-radiation component $\overline{E_{IR}}$. The beamsplitter may separate different wavebands of imaging energy partially or completely. Partial separation means that residual portions of one waveband remain in the discretely separated component of another waveband. In some embodiments, filters and/or other optical elements may be used to remove such residual portions.

A band-specific energy channel can direct a corresponding waveband of imaging energy to a desired target, such as a corresponding detector. For example, once separated, visible-light energy channel 112 can receive and transmit visible-light component $\overline{E_V}$ to a visible-light detector 116, while an infrared-radiation energy channel 114 can receive and transmit infrared-radiation component $\overline{E_{IR}}$ to an infrared-radiation detector 118. The detectors, or signal generators, can then translate the received imaging energy into a suitable image signal, which can be subsequently processed and/or utilized as desired. In some embodiments, a band-specific energy channel can simply be a vacant space through which the energy travels. In other embodiments, a band-specific energy channel can include one or more lenses, mirrors, and/or other suitable devices for redirecting, focusing, and/or otherwise processing the band-specific energy. The components of a band-specific energy channel may be selected and/or treated to facilitate passage of the waveband component of interest, for example, by selectively transmitting and/or selectively detecting the waveband of interest.

Signals from different band-specific energy channels may be processed and used separately and/or collectively. In some cases, the images, or processed derivatives of the images, may be combined to form composite images. For example, composite images may be formed for use in firefighting, aeronautics, surveillance, and/or the like, superimposing infrared images of hot spots, runway lights, persons, and/or the like on visible images. See, e.g., U.S. Pat. No. 6,232,602, issued May 15, 2001, which is incorporated herein by reference in its entirety for all purposes.

V. Examples

The following examples describe selected aspects and embodiments of the present teachings. These aspects and embodiments are included for illustration and are not intended to limit or define the entire scope of the present teachings.

Example 1

This example describes an exemplary off-axis, three-mirror assembly imaging system, constructed in accordance with aspects of the present teachings; see FIG. 8.

FIG. 8 shows a portion of an exemplary three-mirror assembly imaging system 200. The system includes a primary mirror 202, a secondary mirror 204, and a tertiary mirror 206 functioning as an undedicated optical stabilization component. The position of the tertiary mirror may be adjusted by a positioner 208, such as a piezoelectric positioner, as described above. In other embodiments, the position of the primary and secondary mirrors, or combinations of the primary, secondary, and tertiary mirrors, may be adjusted by suitable positioners. Here, unstabilized image data, represented as rays by the directional arrows arriving at primary mirror 202, may be stabilized by the motions of tertiary mirror 206. Specifically, positioner 208 is configured to control the position and orientation of the tertiary mirror 206 in time and space to dither the incoming imaging energy. Positioner 208 optionally may be located in a multi-band energy channel, in which case a beamsplitter 210, located downstream from the tertiary mirror, may split the image data into two separate wavebands, as depicted. Processed image data can be detected and imaged by one or more detectors, not shown, positioned in one or more suitable image planes. Further aspects of a three-mirror assembly imaging system having two band-specific energy channels are described in U.S. Provisional Patent Application Ser. No. 60/696,306, filed Jul. 1, 2005 (see particularly Example 1 and FIG. 8), which is incorporated herein by reference in its entirety for all purposes.

Example 2

Figure 9:
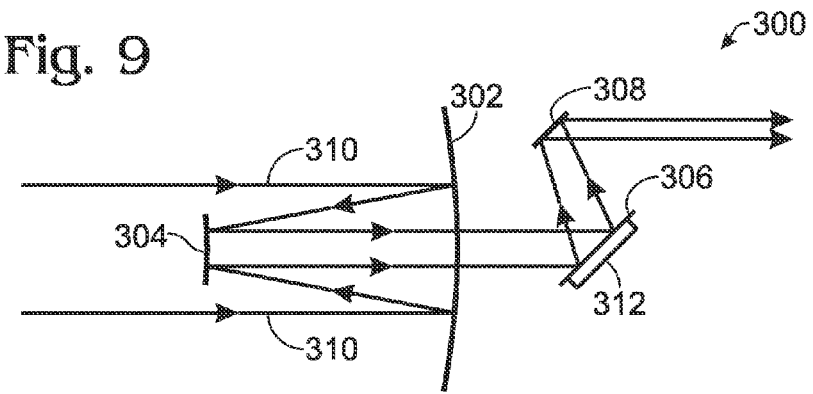
FIG. 9 is a schematic view of an exemplary Cassegrain telescope including a positioner configured to adjust the position and/or orientation of a tertiary or fold mirror.
Figure 10:
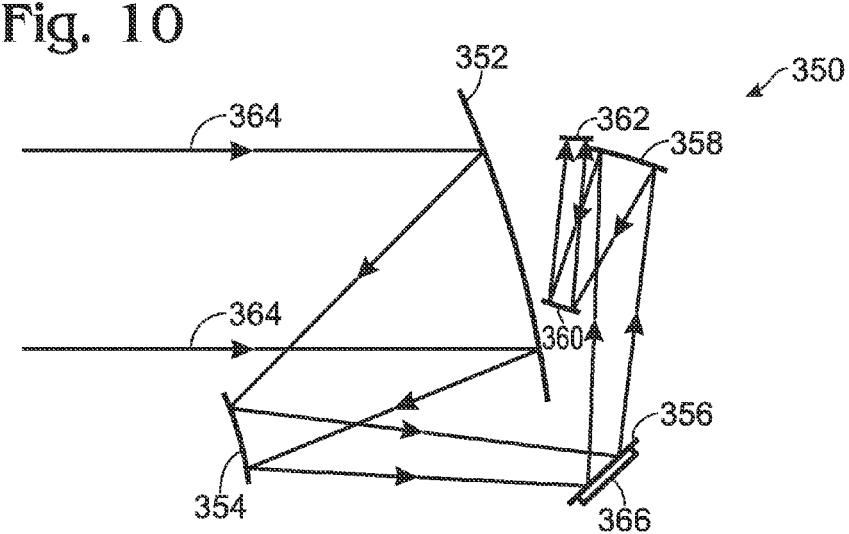
FIG. 10 is a schematic view of an exemplary multi-mirror assembly including a positioner configured to adjust the position and/or orientation of a tertiary mirror.
Figure 11:
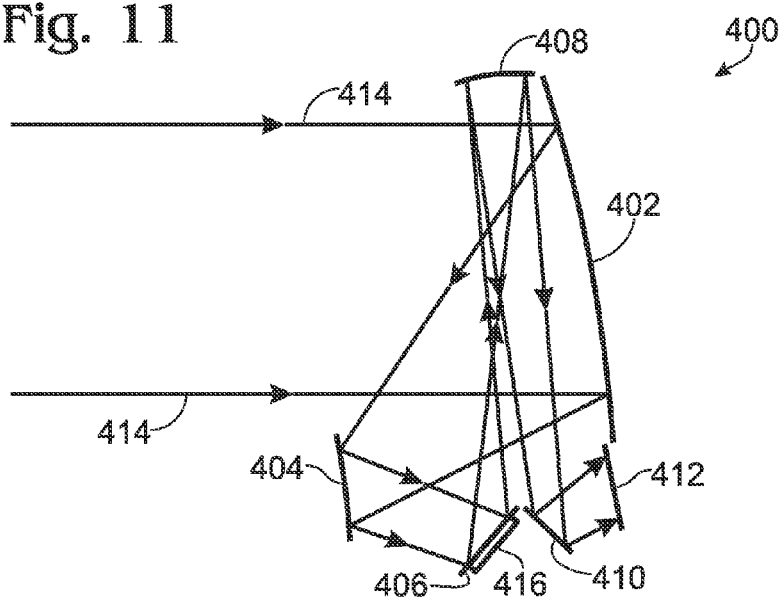
FIG. 11 is a schematic view of another exemplary multi-mirror assembly including a positioner configured to adjust the position and/or orientation of a tertiary mirror.

This example describes several exemplary multi-band energy channels, suitable for use in an imaging system constructed in accordance with aspects of the present teachings; see FIGS. 9-11. Imaging energy can be stabilized and/or dithered, in accordance with the present disclosure, using virtually any multi-band energy channel that includes at least one optical element suitable for selective movement. In general, reflective elements, such as mirrors, are particularly well suited to move to stabilize and/or dither imaging energy. In the following exemplary channels, stabilization and/or dithering may be effected by selectively moving any of the illustrated optical components, relative to other components of the same channel.

FIG. 9 shows an exemplary Cassegrain telescope 300. The telescope includes a primary mirror 302, a secondary mirror 304, a tertiary mirror 306, and a quaternary mirror 308. The optical path for various incident light rays is shown by directional arrows 310. In this system, at least one of the mirrors, typically tertiary mirror 306, may be configured to undergo precise movements so as to act as an undedicated optical stabilization component. A positioner 312 may be provided to cause the tertiary mirror to undergo precise movements to stabilize image data reflecting from the mirror.

FIG. 10 shows an exemplary multi-mirror, off-axis imaging system 350, which is an assembly of six mirrors. This system includes a primary mirror 352, a secondary mirror 354, a tertiary mirror 356, a quaternary mirror 358, a quinary mirror 360, and a senary mirror 362. The optical path for various incident light rays is shown by directional arrows 364. In this system, at least one of the mirrors, typically tertiary mirror 356, may be configured to undergo precise movements so as to act as an undedicated optical stabilization component. A positioner such as positioner 366 may be provided for this purpose.

FIG. 11 shows yet another exemplary multi-mirror, off-axis imaging system 400. This system includes a primary mirror 402, a secondary mirror 404, a tertiary mirror 406, a quaternary mirror 408, a quinary mirror 410, and a senary mirror 412. The optical path for various incident light rays is shown by directional arrows 414. In this system, at least one of the mirrors, typically tertiary mirror 406, may be configured to undergo precise movements so as to act as an undedicated optical stabilization component. A positioner such as positioner 416 may be provided for this purpose.

Example 3

This example describes additional image stabilization systems, constructed in accordance with aspects of the present teachings. Specifically, the systems described herein optionally may be combined with other systems for improving image acquisition and/or quality, including hardware and/or software systems, for example, as described in U.S. patent application Ser. No. 11/207,536, filed Aug. 19, 2005, which is incorporated herein by reference in its entirety for all purposes.

Example 4

This example describes exemplary aspects and utilities of scanning and dithering. These terms may be used to describe defined, persistent motions, which may be regular or periodic, including but not limited to executing a repeating spatial pattern through oscillation, vacillation, and/or other mechanisms. In some cases, scanning may be used, if at all, to create an initial image or spectral pattern. In the same or other cases, dithering may be used, if at all, to improve spectral or spatial resolution by fractions of the original resolution.

Dithering generally may be applied to any spatially resolved detection or imaging system. For example, in a representative imaging system, a positioner may be controlled so that imaging energy is dithered on a detector. As the imaging energy is dithered on the detector, the detector may be configured to sample the imaging energy as subframes that correspond to the different positions of the positioner. The subframes then can be used to generate a higher resolution image. As a nonlimiting example, a 320×240 pixel detector can be sampled at 120 Hertz and the imaging energy can be moved ½ of a pixel four times (e.g., in a bow-tie pattern) at a rate of 120 Hertz, thus allowing a composite 30 Hertz image having 640×480 pixels to be formed.

A similar approach can be applied to a detector detecting a spectral pattern. The pattern can be shifted by a fraction of a pixel, allowing detection of lines that are too close to be distinguished without the dither. For example, consider 128 equal power spectral lines evenly spaced on a 128-element linear array detector. The signal from the array may be large at every pixel, and no distinguishing information may be present. However, when dithering is applied, and the rays are moved multiple times along the array, some lines will cross pixels and others can be placed with a portion on one pixel and a portion on a neighboring pixel. By considering the manner in which the imaging energy is moved on the detector, and by processing the output, the lines can be discerned and more accurately measured. The increase in array resolution can be approximately the same as the number of dither steps. Thus, the 128-element array can be used to form 256 pixels across the spectrum by dithering two steps, 384 pixels by dithering 3 steps, 512 pixels by dithering 4 steps, and so on.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An image stabilization system, comprising:
   an image detector;
   a primary mirror configured to receive incoming image data representing an image and reflect the image data toward a secondary mirror;
   a secondary mirror positioned to receive image data reflected by the primary mirror and reflect the image data toward a tertiary mirror;
   a tertiary mirror positioned to receive image data reflected by the secondary mirror and reflect the image data toward the image detector;
   a positioner configured to adjust position and orientation of at least one of the primary, secondary, or tertiary mirrors;
   an electronic controller configured to control motions of the positioner to compensate in real time for vibration of a platform to which the system is mounted; and
   a non-imaging detector configured to sense vibration and to transmit data corresponding to the vibration to the controller, the controller being further configured to respond by compensating in real time for the vibration by controlling the motions of the positioner;
   wherein the primary mirror defines a first axis, and wherein the secondary mirror defines a second axis forming a nonzero intersecting angle with the first axis.

2. The system of claim 1, wherein the non-imaging detector is a gyroscope attached to the platform.

3. The system of claim 1, wherein the non-imaging detector is an inertial measurement unit attached to the platform.

4. The system of claim 1, wherein the platform is an aircraft.

5. The system of claim 1, wherein the positioner is configured to make precise adjustments in position and orientation of the tertiary mirror.

6. The system of claim 1, wherein the positioner is further configured to facilitate tracking a moving target with the system.

7. The system of claim 1, wherein the positioner is further configured to correct alignment errors in the system.

8. The system of claim 1, wherein the positioner is further configured to compensate for atmospheric effects.

9. The system of claim 1, wherein the positioner includes a first piezoelectric device operatively coupled to a top portion of the at least one mirror, and a second piezoelectric device operatively coupled to a bottom portion of the at least one mirror.

10. The system of claim 9, wherein the first and second piezoelectric devices are configured to selectively move the at least one mirror linearly, and are further configured to selectively tilt the at least one mirror.

11. The system of claim 1, wherein the positioner includes a deformable top portion of the at least one mirror, and a deformable bottom portion of the at least one mirror.

12. The system of claim 1, further comprising a beamsplitter configured to receive the image data reflected by the tertiary mirror and to split the image data into a first beam of at least substantially visible light, and a second beam of at least substantially infrared light.

13. The system claim 12, further comprising:
   a visible light detector configured to receive the first beam and to translate the first beam into a first image signal; and
   an infrared detector configured to receive the second beam and to translate the second beam into a second image signal.

14. The system of claim 1, wherein the positioner is constructed from a material having a first coefficient of thermal expansion and at least one mirror configured to be adjusted by the positioner is constructed from a material having a second coefficient of thermal expansion, and wherein the first and second coefficients of thermal expansion are matched.

15. The system of claim 14, further comprising an optical support structure configured to hold and support the associated mirror(s), wherein the coefficients of thermal expansion of the positioner, the mirror(s) configured to be adjusted by the positioner, and the optical support structure are matched.

16. The system of claim 14, wherein the coefficients of thermal expansion of the positioner, primary mirror, secondary mirror, and tertiary mirror are matched.

17. The system of claim 14, wherein the mirror(s) configured to be adjusted by the positioner are formed of silicon carbide.

18. The system of claim 14, wherein the positioner is formed of a nickel-steel alloy.

19. The system of claim 18, wherein the nickel-steel alloy is 39Ni/Fe.

20. The system of claim 1, wherein the non-imaging detector is a force-sensing device.

* * * * *